US005481408A

United States Patent [19]

Shimada

[11] Patent Number: 5,481,408

[45] Date of Patent: Jan. 2, 1996

[54] METHOD OF MANUFACTURING AN ILLUMINATING REFLECTION MIRROR

[75] Inventor: Mizuho Shimada, Yokohama, Japan

[73] Assignee: Equestrian Co., Ltd., Tokyo, Japan

[21] Appl. No.: 206,229

[22] Filed: Mar. 7, 1994

Related U.S. Application Data

[63] Continuation of Ser. No. 924,983, Aug. 5, 1992, abandoned.

[51] Int. Cl.[6] .............................. G02B 5/08; G02B 5/10

[52] U.S. Cl. .......................... 359/838; 359/869; 359/900; 362/296; 362/341; 362/347

[58] Field of Search .................................. 359/867, 868, 359/869, 900, 838; 362/296, 61, 296, 297, 341, 346, 347

[56] References Cited

U.S. PATENT DOCUMENTS

| | | | |
|---|---|---|---|
| 1,763,630 | 6/1930 | Hopkins | 359/869 |
| 2,106,533 | 1/1938 | Nielsen | 362/296 |
| 2,191,546 | 2/1940 | Schreiber | 362/296 |
| 2,257,366 | 9/1941 | Bates et al. | 362/296 |
| 2,688,271 | 9/1954 | Gretener | 362/296 |
| 2,894,428 | 7/1959 | Eber et al. | 362/296 |
| 3,476,930 | 11/1969 | Herman et al. | 362/296 |
| 4,481,563 | 11/1984 | Snyder et al. | 359/838 |
| 5,086,376 | 2/1992 | Blusseau | 362/61 |
| 5,192,124 | 3/1993 | Kawashima et al. | 362/297 |

OTHER PUBLICATIONS

Gretner; "A Comparison of the Ventarc Mirror With the Elliptical Mirror"; International Projectionist; Dec. 1950, pp. 24–25.

*Primary Examiner*—Ricky D. Shafer
*Attorney, Agent, or Firm*—Lowe, Price, LeBlanc & Becker

[57] ABSTRACT

The distance between the base point of the light source and the curvature start point of the virtual reflection mirror is preset. Then the distance between the curvature start point of the virtual reflection mirror and the start point of the object being illumined is set. The ray of light striking the entire object is determined by the fourth straight line. As the fourth straight line is progressively moved, the third straight line is also progressively moved from the curvature start point of the virtual reflection mirror to describe the locus of the curvature of the virtual reflection mirror. This locus is obtained as the light distribution data for the object.

6 Claims, 3 Drawing Sheets

METHOD OF MANUFACTURING AN ILLUMINATING REFLECTION MIRROR

This application is a continuation of application Ser. No. 07/924,983 filed Aug. 5, 1992, now abandoned.

BACKGROUND OF THE INVENTION

1. Field of the Invention

The present invention relates to a method of manufacturing an illuminating reflection mirror that throws light of a light source upon an object, and more specifically to a method of manufacturing an illuminating reflection mirror, which determines the dimensions of the mirror by moving a fourth point that is used to calculate the range of screen illumination of the object and the light distribution on the basis of the distances to the first three points.

2. Description of the Prior Art

Among conventional reflection mirrors installed in this kind of illuminating equipment that have wide applications are oval mirror or a parabolic mirror. They are used for photographing, stage and screen illumination, lighting of such locations that require a special watch at night, and for illuminating assembly parts in factory and products in show rooms. Various kinds reflection mirrors are available in many sizes. When a base point r' of the light source R' is determined with respect to the reflection mirror M', the light scattering on the screen S' is determined. Two points—the base point r' of the light source R' and the geometrical position point M' of the reflection mirror M'—are used as data to simulate the light distribution on the screen S' (FIG. 5).

The conventional reflection mirrors are made by molding the reflection mirror base body of various sizes in several kinds of prefabricated molds. The dimensions of these molds of the reflection mirrors are determined based on the data of only two points—the base point r' of the light source R' and the geometrical position point M' of the reflection mirror M'. This method of manufacturing does not use the positional relationship among four points in the light distribution on the screen, an object to be illuminated.

SUMMERY OF THE INVENTION

The method of:making an illuminating reflection mirror according to this invention comprises the steps of: setting distances among three points—a base point of the light source, a curvature start point of the virtual reflection mirror located at a specified distance from the base point, and a start point of the object illuminated by the reflected light; and describing a first straight line from the base point of the light source to the curvature start point, a second straight line connecting the curvature start point and the start point of the object to form an angle by the first and the second straight lines, a third straight line bisecting the angle, and a fourth straight line extending perpendicular to the third straight line, in order to obtain the curvature of the virtual reflection mirror. The curvature thus obtained can be used as data of the shape of a concave reflection mirror in the mirror making process. It is also possible to express a desired shade on the object to be illumined. Further, since the blurred illumination of the object can be eliminated, products in a show window can be exhibited under the bright illumination. Moreover, the light source can be reduced in size, thus contributing to an energy saving. In the case of printing developed pictures, the invention eliminates variations in the finished quality substantially improving the productivity.

In a preferred embodiment, the distance between the base point of the light source and the curvature start point of the virtual reflection mirror is preset. Then the distance between the curvature start point of the virtual reflection mirror and the start point of the object is set. The ray of light striking the object is determined by the fourth straight line to set the light distribution over the entire object. As the fourth straight line is progressively shifted, the third straight line is also progressively moved from the curvature start point of the virtual reflection mirror to describe the curvature of the virtual reflection mirror, which is used as the data of light distribution over the object.

Therefore it is an object of the invention to provide a method of making an illuminating reflection mirror which can generate a desired light distribution over the screen, for example, an object to be illuminated.

Another object of the invention is to provide a method of making an illuminating reflection mirror which can easily simulate the desired shade of light distribution on the object being illuminated.

A still another object of the invention is to provide a method of making an illuminating reflection mirror, which can determine the shape of the virtual reflection mirror from the data of light distribution on the object by presetting the distance between the base point of the light source and the virtual reflection mirror, setting the distance between the virtual reflection mirror and the object to be illuminated, and forming a light ray determining line.

BRIEF DESCRIPTION OF THE DRAWINGS

The drawings show one embodiment of the invention, illustrating the method of manufacturing an illuminating reflection mirror.

DETAILED DESCRIPTION OF PREFERRED EMBODIMENT

The above objects and features of the invention will become apparent from the following description and attached drawings.

Figure 1:
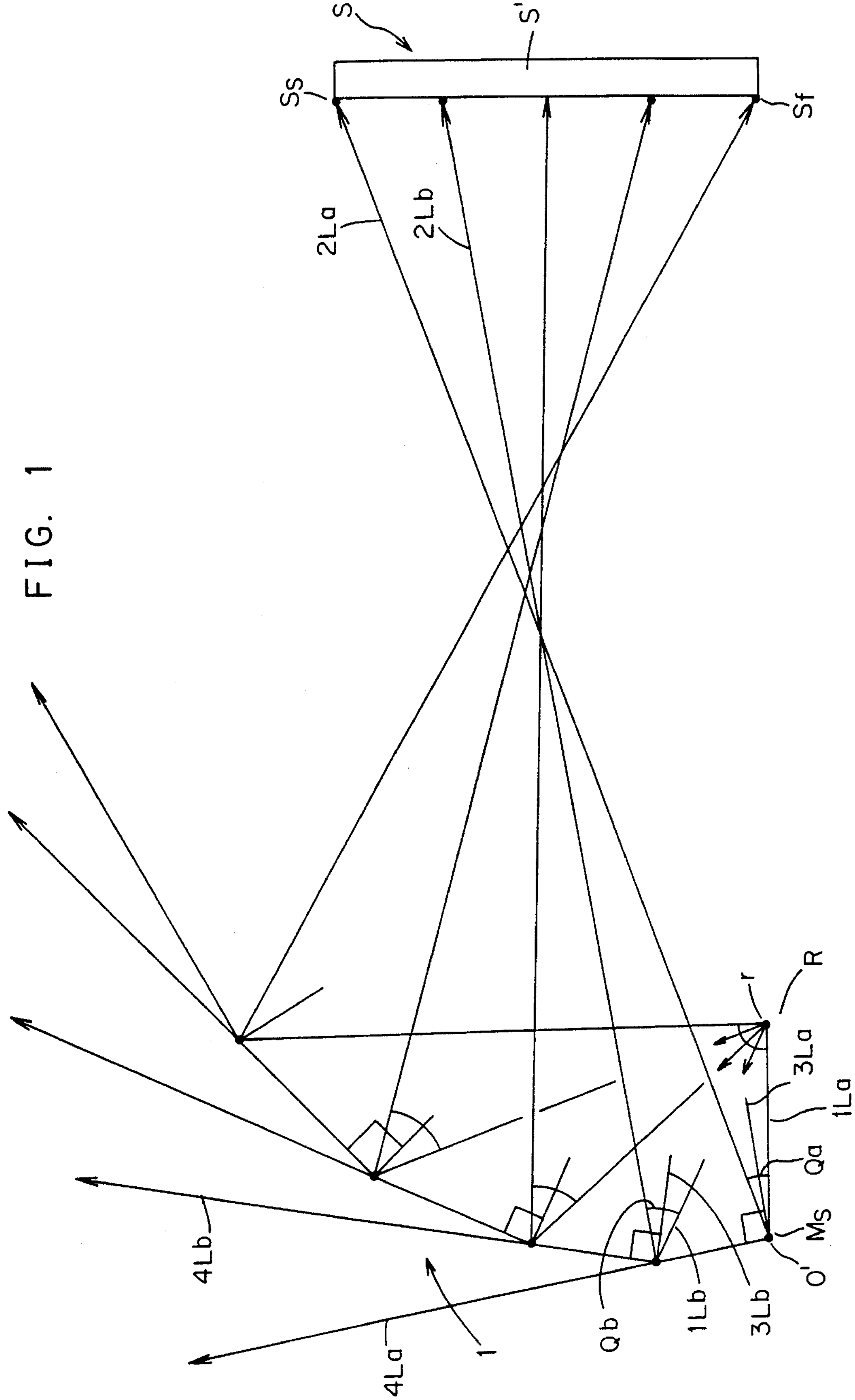
FIG. 1 is an explanatory view showing the method of manufacturing a virtual reflection mirror according to this invention.

Referring to FIG. 1, the method of manufacturing the illuminating reflection mirror M according to this invention sets three points: the base point r of the light source R, a curvature starting point Ms of the virtual reflection mirror M at a certain distance from the base point r, and an illumination starting point Ss of an object S to be illuminated by the reflected light. This method then describes a first straight line 1La from the base point r of the light source R; a second straight line 2La connecting the curvature starting point and the start point Ss on the illuminated object S to define an angle Qa in cooperation with the first straight line 1La; a third straight line 3La bisecting said angle Qa and a fourth straight line 4La that is perpendicular to the third straight line 3La.

The distance between the base point r of the light source R and the curvature starting point Ms of the virtual reflection mirror M is preset. Then the distance between the curvature starting point Ms of the virtual reflection mirror M and the starting point Ss of the illuminated object S is set. To obtain the light distribution for the entire illuminated object S, the light ray is determined by the third straight line 3La. As the third straight line 3La is moved, the third straight line 3La moves progressively from the curvature starting point Ms of the virtual reflection mirror M, describing the curved locus of the virtual reflection mirror M. This locus is used as the light distribution data for the object S.

Subsequent illumination points are located on the object S at an infinitely small distances away from preceding illumination points. Each time, a subsequent straight line (e.g., 1Lb) is located to produce a subsequent imaginary incident ray extending at an infinitely small angle from the preceding imaginary incident ray to locate a subsequent curvature point on the tangential line (e.g., 4La) by simultaneously drawing a straight line (e.g., 2Lb) from the subsequent illustration point by reflection such that a subsequent angle (e.g., Qb) is defined between the subsequent straight line (1Lb) and the straight line (2Lb).

A straight line (e.g., 3Lb) is drawn to produce a subsequent incident normal by dividing the subsequent angle (Qb) equally into two. Next a subsequent tangential line (e.g., 4Lb) which extends through the subsequent curvature point perpendicularly to the straight line (3Lb) is drawn. These steps are repeated to draw a curvature representing a mirror surface by use of numerous tangential lines obtained from the repetition of the steps.

Figure 2:
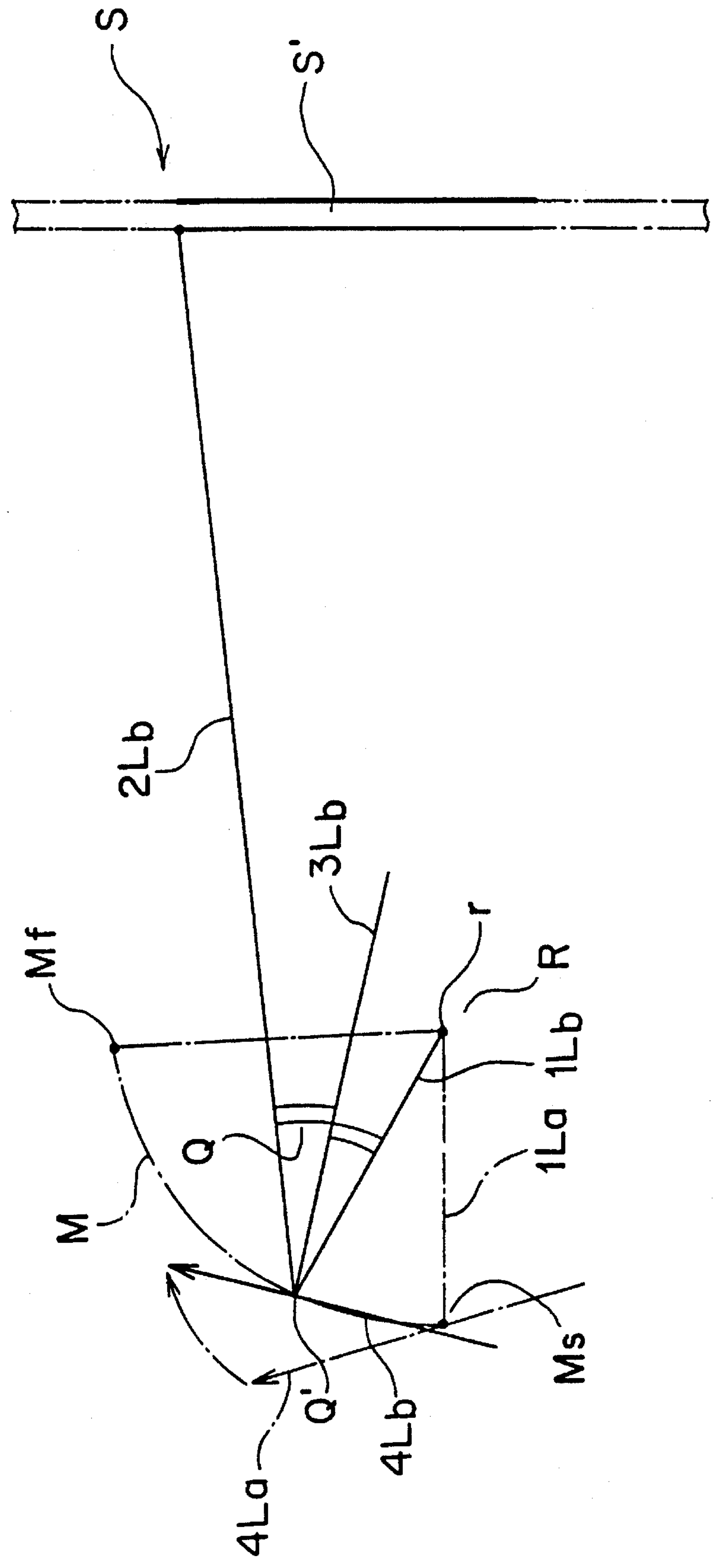
FIG. 2 is a partially enlarged view of an essential portion of FIG. 1.

This invention is described in detail by referring to FIG. 2. The distance between the base point r of the light source R and the curvature starting point Ms of the virtual reflection mirror M can be set beforehand. The distance between the curvature starting point Ms and the object S to be illuminated can also be set. Therefore, the base point r and the curvature starting point Ms define the first straight line 1La. Further, the curvature starting point Ms and the starting point Ss of the object S can be connected by the second straight line 2La as a ray of light. At an intersecting point Q' between the first straight line 1La and the second straight line 2La which is taken as a vertex of an angle Q between the two lines, the third straight line 3La is formed which is a tangent line. The fourth straight line 4La is drawn perpendicular to the third straight line 3La and which moves together with the first straight line 1La to determine the locus of light ray thrown upon the object S.

If the object S is a screen S', for example, the second straight line is progressively moved an infinitely small distance from the start point Ss at one end of the screen S' toward the other end Sf. As the second straight line moves an infinitely small distance from the position 2La to the position 2Lb, the third straight line also moves from the position 3La to the position 3Lb, in accordance with the luminous intensity distribution on the screen S' while at the same time the fourth straight line moves an infinitely small distance together with the first line which is moved an infinitely small angle from the position 4La to the position 4Lb. As a result, the numerous fourth straight lines describes the locus of a curvature of the virtual reflection mirror M, starting with one end of the virtual reflection mirror M, i.e., the curvature start point Ms, and ending with the other end Mf.

Figure 3:
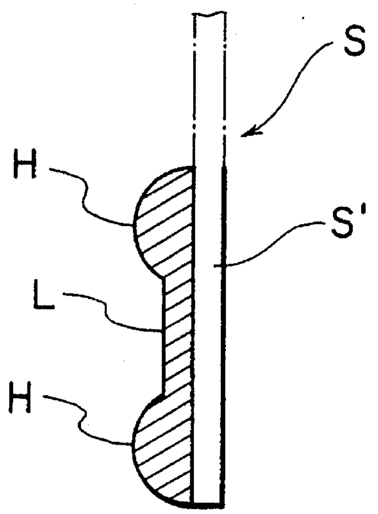
FIG. 3 is an explanatory view showing a luminous intensity distribution according to this invention.
Figure 4:
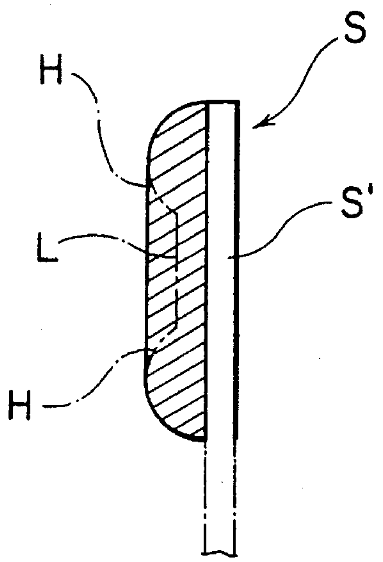
FIG. 4 is an explanatory view showing another luminous intensity distribution according to this invention.
Figure 5:
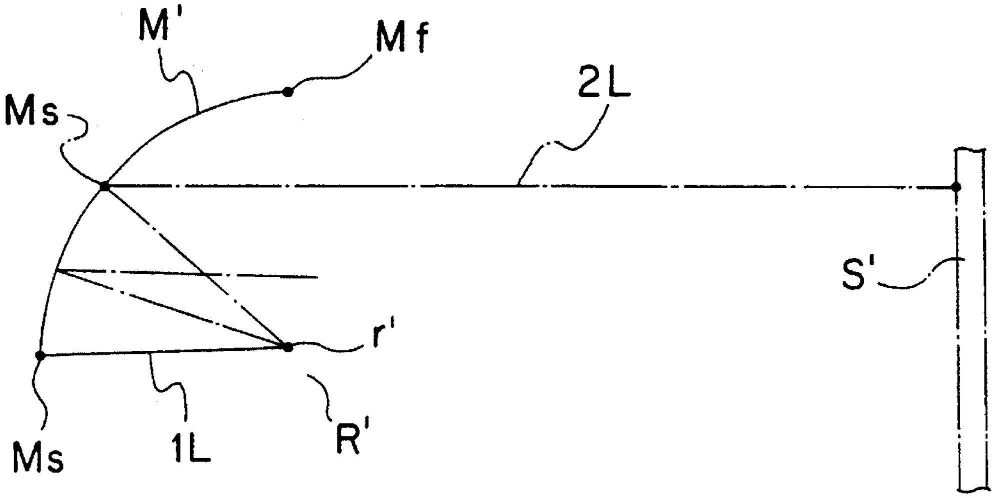
FIG. 5 PRIOR ART
FIG. 5 is an explanatory view showing the method of manufacturing the conventional illuminating reflection mirror.

FIG. 3 shows the luminous intensity distribution according to this invention, in which the light intensity is high at both ends of the illumined object S and low at the central portion. FIG. 4 shows another luminous intensity distribution produced by this invention, which shows that the light distribution can be determined so that the entire object S can be illuminated uniformly.

What is claimed is:

1. A method of designing an illuminating reflection mirror having a reflective surface, the shape of which reflective surface corresponds to a desired illumination intensity pattern to be projected by said mirror on an illumination object, said method comprising the steps of:

a) providing an illumination object;

b) defining a plurality of illumination points which correspond to said desired illumination intensity pattern on said illumination object wherein a greater density of illumination points corresponds to a greater illumination intensity to be applied to said illumination object;

c) locating a light source (R) at a given distance from said illumination object (S);

d) selecting an initial one of said plurality of illumination points (Ss) on said illumination object (S) and a curvature starting point (Ms) on a remote side of said light source (R) and drawing a straight line (1La) to produce an imaginary incident ray from said light source (R) to said curvature starting point (Ms) and a straight line (2La) to produce a reflected ray from said curvature starting point (Ms) to said initial illumination point (Ss) to define an angle (Qa) between said straight line (1La) and said straight line (2La);

e) drawing a straight line (3La) to produce an incident normal by bisecting said angle (Qa) equally into two angles;

f) drawing a tangential line (4La) extending through said curvature starting point (Ms) perpendicularly to said straight line (3La) to produce an imaginary reflected light emitted from the light source (R) that is reflected at said curvature starting point (Ms) toward said initial illumination point (Ss) by reflection, said straight line (3La) producing an incident normal;

g) selecting an adjacent one of said plurality of illumination points on said illumination object;

h) locating a subsequent straight line (1Lb) from said light source extending at an angle from the preceding imaginary incident ray to produce a subsequent imaginary incident ray and to locate a subsequent curvature point on said tangential line (4La) while simultaneously drawing a straight line (2Lb) from said subsequent illumination point by reflection such that a subsequent angle (Qb) is defined between said subsequent straight line (1Lb) and said straight line (2Lb);

i) drawing a straight line (3Lb) to produce a subsequent incident normal by bisecting said subsequent angle (Qb) equally into two angles;

j) drawing a subsequent tangential line (4Lb) extending through said subsequent curvature point perpendicularly to said straight line (3Lb); and k) repeating the steps g) through j) to produce a series of curvature points which represent a reflective mirror surface.

2. A method according to claim 1, wherein said desired illumination intensity pattern is high at both ends of the illumination object.

3. A method according to claim 1, wherein said desired illumination intensity pattern is uniform over the entire illumination object.

4. A method of manufacturing an illuminating reflection mirror from data which is used to produce the curvature of a reflective surface of said mirror, said mirror having a reflective surface, the shape of which reflective surface corresponds to a desired illumination intensity pattern to be projected by said mirror on an illumination object, from date, said method comprising determining said data by the steps of:

a) providing an illumination object;

b) defining a plurality of illumination points which correspond to said desired illumination intensity pattern on said illumination object wherein a greater density of illumination points corresponds to a greater illumination intensity to be applied to said illumination object;

c) locating a light source (R) at a given distance from said illumination object (S);

d) selecting an initial one of said plurality of illumination points (Ss) on said illumination object (S) and a curvature starting point (Ms) on a remote side of said light source (R) and drawing a straight line (1La) to produce an imaginary incident ray from said light source (R) to said curvature starting point (Ms) and a straight line (2La) to produce a reflected ray from said curvature starting point (Ms) to said initial illumination point (Ss) to define an angle (Qa) between said straight line (1La) and said straight line (2La);

e) drawing a straight line (3La) to produce an incident normal by bisecting said angle (Qa) equally into two angles;

f) drawing a tangential line (4La) extending through said curvature starting point (Ms) perpendicularly to said straight line (3La) to produce an imaginary reflected light emitted from the light source (R) that is reflected at said curvature starting point (Ms) toward said initial illumination point (Ss) by reflection, said straight line (3La) producing an incident normal;

g) selecting an adjacent one of said plurality of illumination points on said illumination object;

h) locating a subsequent straight line (1Lb) from said light source extending at an angle from the preceding imaginary incident ray to produce a subsequent imaginary incident ray and to locate a subsequent curvature point on said tangential line (4La) while simultaneously drawing a straight line (2Lb) from said subsequent illumination point by reflection such that a subsequent angle (Qb) is defined between said subsequent straight line (1Lb) and said straight line (2Lb);

i) drawing a straight line (3Lb) to produce a subsequent incident normal by bisecting said subsequent angle (Qb) equally into two angles;

j) drawing a subsequent tangential line (4Lb) extending through said subsequent curvature point perpendicularly to said straight line (3Lb); and k) repeating the steps g) through j) to produce a series of curvature points which are used as data to manufacture a reflective mirror surface.

5. A method according to claim 4, wherein the desired illumination intensity pattern is high at both ends of the illumination object.

6. A method according to claim 4, wherein the desired illumination intensity pattern is uniform over the entire illumination object.

* * * * *